(12) United States Patent
Yajima

(10) Patent No.: US 7,749,579 B2
(45) Date of Patent: Jul. 6, 2010

(54) ROLLED OPTICAL FILM

(75) Inventor: Takatoshi Yajima, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 557 days.

(21) Appl. No.: 11/563,733

(22) Filed: Nov. 28, 2006

(65) Prior Publication Data
US 2007/0128381 A1   Jun. 7, 2007

(30) Foreign Application Priority Data
Dec. 5, 2005 (JP) .............................. 2005-350287

(51) Int. Cl.
*G02F 1/1333* (2006.01)
(52) U.S. Cl. .................. 428/1.33; 428/156; 428/906; 264/2.7; 264/1.34; 264/217; 349/96
(58) Field of Classification Search .................. 428/1.3, 428/906, 1.33, 156; 264/1.31, 1.34, 2.7, 264/217; 349/96
See application file for complete search history.

(56) References Cited

U.S. PATENT DOCUMENTS

| | | | | |
|---|---|---|---|---|
| 2,034,716 A * | 3/1936 | Dreyfus | ...................... | 264/218 |
| 2,052,695 A * | 9/1936 | Chiverton | ..................... | 264/76 |
| 2,229,613 A * | 1/1941 | Strauch | ....................... | 156/199 |
| 2,237,693 A * | 4/1941 | Wildon | ........................ | 446/60 |
| 2,255,353 A * | 9/1941 | Griswold | ..................... | 36/22 A |
| 2,270,535 A * | 1/1942 | Young et al. | .................. | 362/19 |
| 2003/0020208 A1* | 1/2003 | Tasaka et al. | ............... | 264/217 |
| 2004/0044127 A1* | 3/2004 | Okubo et al. | .............. | 525/54.3 |
| 2004/0052977 A1* | 3/2004 | Ogawa et al. | ................. | 428/1.1 |
| 2004/0091642 A1* | 5/2004 | Murakami et al. | .......... | 428/1.31 |
| 2005/0046074 A1* | 3/2005 | Tasaka et al. | ................ | 264/207 |
| 2006/0141243 A1* | 6/2006 | Ibuki | ........................... | 428/334 |
| 2006/0204718 A1* | 9/2006 | Kawakami | ................... | 428/141 |
| 2006/0214319 A1* | 9/2006 | Kazama | ...................... | 264/1.34 |

(Continued)

FOREIGN PATENT DOCUMENTS

JP   2000-280315   10/2000

(Continued)

OTHER PUBLICATIONS

JPO Website Machine English Translation of JP 2005-12360, Okajima, May 19, 2005.*

(Continued)

*Primary Examiner*—Sophie Hon
(74) *Attorney, Agent, or Firm*—Lucas & Mercanti, LLP

(57) ABSTRACT

A rolled optical film includes a cellulose ester film which has a width of from 1 m to 3 m and a length of 500 m or more and is shaped in a rolled film. The cellulose ester film includes streaks from 1 line to 20 lines per 10 mm in a lateral direction thereof in which the streaks have a height of from 50 nm to 300 nm, an inclination of from 50 nm/mm to 300 nm/mm and a continuous length of 50 cm or more in a longitudinal direction thereof and the cellulose ester film does no includes a streak which has a height of 300 nm or more, an inclination of 300 nm/mm or more and a continuous length of 50 cm or more in a longitudinal direction thereof.

12 Claims, 2 Drawing Sheets

U.S. PATENT DOCUMENTS

2006/0216439 A1 * 9/2006 Shimizu et al. ............ 428/1.31

FOREIGN PATENT DOCUMENTS

| JP | 2005-055619 | 3/2005 |
|---|---|---|
| JP | 2005-128360 | 5/2005 |
| JP | 2005-173072 | 6/2005 |

OTHER PUBLICATIONS

JPO Website Machine English Translation of JP 2005-173072, Okajima, Jun. 30, 2005.*

JPO Website Machine English Translation of JP 2005-055619, Sakaguchi, Mar. 3, 2005.*

* cited by examiner

ROLLED OPTICAL FILM

This application is based on Japanese Patent Application No. 2005-350287 filed on Dec. 5, 2005 in Japanese Patent Office, the entire content of which is hereby incorporated by reference.

BACKGROUND OF THE INVENTION

The present invention relates to rolled optical film, which shows no light leakage and no luminous streaks due to die lines when being viewed on a liquid crystal display, even without utilizing masking film and a sliding agent.

A liquid crystal display has been commonly utilized as a monitor due to advantages of space saving and energy saving compared to a conventional CRT display. Further, it has been popularized as a TV application. In such a liquid crystal display, utilized are various types of optical film such as polarizer film, phase difference film, anti-reflection film and luminance enhancing film.

Polarizer film is comprised of a polarizer element made of stretched polyvinyl alcohol film on one surface or the both surfaces of which cellulose ester film is accumulated as a protective layer. Further, phase difference film is utilized for the purpose of such as viewing angle enlargement and contrast improvement, and is comprised of film which is made of such as polycarbonate, polymer having an alicyclic structure and cellulose ester, and stretched to be provided with retardation, or a transparent substrate on which a liquid crystal layer is coated. Phase difference film is also referred to as optical compensation film. In such as a liquid crystal panel of a VA mode, phase difference film can be pasted up with a polarizer plate in a roll-to-roll manner when the slow axis of phase difference film is along the width direction, resulting in significant improvement of productivity compared to a conventional batch-wise pasting.

These optical films are required to have no optical defects and to be provided with uniform retardation. In particular, a large image plane and high definition of a monitor and a TV are prevailing to make these required qualities more and more severe.

A manufacturing method of optical film is roughly classified into a solution casting method and a melt casting method.

In a solution casting method, polymer is dissolved in a solvent and the solution is cast on a support, the solvent being evaporated, and is further appropriately stretched to be made into film. Polymer soluble in a solvent can be applicable, and such as norbornene type polymer film and cellulose triacetate film have been commonly utilized with respect to excellent uniformity of layer thickness, however, there were problems of such as requirement of large facilities to dry up the solvent.

Further, optical film is preferably finished not in a sheet form but in a roll form with respect to productivity at the time of such as pasting up with a polarizer plate, however, there has been a case to show light leakage to make an image whitish blurry when an image is displayed on a liquid crystal display in which optical film prepared by a solution casting method, being wound in a roll form as it is, is pasted up with a polarizer plate. Therefore, it has been uneconomical to require subsidiary materials, which are not essentially required, such as to wind up while protecting the surface with a masking film, to incorporate a sliding agent in film or to accumulate a sliding agent on the film surface.

A melt casting method is a method in which polymer is melt with heating to be cast on a support, followed by being cooled to be solidified, and is further appropriately stretched to be made into film. Therefore a melt casting method has an advantage of making the facilities relatively compact since there required no drying of a solvent. However, since the viscosity of melt polymer is significantly higher than that of a polymer solution to make leveling on a support difficult, resulting in a strong defect of a streak form called as a die line in the prepared optical film. When this die line is excessively strong, there has been a problem that luminous streaks due to a die line are observed when the prepared optical film is assembled in a liquid crystal display.

In such a view point, proposed has been optical film in which luminous streaks due to a die line are reduced.

In JP-A 2005-173072 (hereinafter, JP-A refers to Japanese Patent Publication Open to Public Inspection No.), proposed has been optical film in which die lines formed along the longitudinal direction of optical film is not more than 10 lines per 1 m long in the short direction of optical film.

In JP-A 2005-128360, proposed has been optical film in which a height from the valley bottom to the mountain peak, being adjacent to each other, of a die line formed along the longitudinal direction of optical film is not more than 100 nm in the whole film surface and an inclination of a die line on the film surface is not more than 300 nm/mm in the whole film surface.

In JP-A 2005-55619, proposed has been optical film in which both a depth and a height of a die line formed along the longitudinal direction of optical film are not more than 50 nm and a width thereof is not less than 500 μm.

In JP-A 2000-280315, proposed has been optical film in which the surface roughness is not more than 0.3 μm base on maximum roughness Rt notation.

In any of these examples, the effect is explained in the case of utilizing norbornene type polymer as polymer.

However, when the inventors of this invention wound up cellulose ester film, having die lines in a range of the above described patents, around a core to prepare rolled optical film, which was pasted up on a polarizer plate while being unwound, the polarizer plate accumulated with optical film being cut to be assembled in a liquid crystal display, and an image was displayed thereon; light leakage which makes an image whitish blurred was observed. It has been proved that masking film or a matting agent is still required to solve this problem.

Cellulose film is characterized by being superior in adhesion with a polarizer plate and having suitable moisture permeability when being pasted on a polarizer plate, which is stretched in a wet method, in addition to by having optical uniformity and few optical defects. Therefore, desired has been rolled optical film comprising cellulose ester film in which the above-described various problems have been overcome.

[Patent literature 1] JP-A 2005-173072
[Patent literature 2] JP-A 2005-128360
[Patent literature 3] JP-A 2005-55619
[Patent literature 4] JP-A 2000-280315

SUMMARY OF THE INVENTION

Therefore, an object of this invention is to provide rolled optical film comprising cellulose ester film in which, even without utilizing masking film or a matting agent, light leakage and luminous streaks due to die lines are decreased when being observed on a liquid crystal display.

As a result of extensive study on the relationship between die lines and luminous streaks due thereto, in the case of cellulose ester film prepared by a melt casting method, the inventors of this invention have found that a range of a die line form to show a good performance differs from that in the case of norbornene type polymer film. Further, it has been found that luminous streaks due to die lines are not observed as well as there is a range not to generate light leakage as optical film, in the case of a specific die line form, resulting in achievement of this invention.

The above object can be attained by the following structures.

Item 1. A rolled optical film, comprises:

a cellulose ester film having a width of from 1 m to 3 m and a length of 500 m or more and shaped in a rolled film;

wherein the cellulose ester film includes streaks from 1 line to 20 lines per 10 mm in a lateral direction thereof in which the streaks have a height of from 50 nm to 300 nm, an inclination of from 50 nm/mm to 300 nm/mm and a continuous length of 50 cm or more in a longitudinal direction thereof and the cellulose ester film does no includes a streak which has a height of 300 nm or more, an inclination of 300 nm/mm or more and a continuous length of 50 cm or more in a longitudinal direction thereof.

Item 2. In the rolled optical film described in Item 1, the cellulose ester film includes streaks from 2 lines to 10 lines per 10 mm in a lateral direction thereof in which the streaks have a height of from 100 nm to 200 nm.

Item 3. In the rolled optical film described in Item 1, the cellulose ester film has a thickness of from 30 μm to 200 μm.

Item 4. In the rolled optical film described in Item 1, the cellulose ester film contains one of cellulose acetate propionate, cellulose acetate butyrate and cellulose acetate propionate butyrate.

Item 5. In the rolled optical film described in Item 1, the cellulose ester film contains an organic solvent having a boiling point of not higher than 110° C. in an amount of less than 0.01 weight %.

Item 6. In the rolled optical film described in Item 5, the cellulose ester film does not contain the organic solvent.

Item 7. A polarizing plate comprises the optical film obtained from the rolled optical film described in Item 1 as a protective film.

Item 8. A liquid crystal display device comprises the polarizing plate described in Item 7.

Item 9. A manufacturing method of manufacturing a rolled optical film, comprising:

a casting process of extruding a cellulose ester resin melted by heat on a support from an extruder so as to cast the melted cellulose ester resin onto a support;

a pushing process of pushing a touch roll onto a cellulose ester film formed on the support;

a separating process of separating the cellulose ester film from the support;

a stretching process of stretching the separated cellulose ester film with a stretching device; and a winding process to wind the cellulose ester film into a rolled optical film having a width of from 1 m to 3 m and a length of 500 m or more;

wherein the cellulose ester film of the rolled optical film includes streaks of from 1 line to 20 lines per 10 mm in a lateral direction thereof in which the streaks have a height of from 50 nm to 300 nm, an inclination of from 50 nm/mm to 300 nm/mm and a continuous length of 50 cm or more in a longitudinal direction thereof and the cellulose ester film does no includes a streak which has a height of 300 nm or more, an inclination of 300 nm/mm or more and a continuous length of 50 cm or more in a longitudinal direction thereof.

Item 10. In the manufacturing method described in Item 9, in the stretching process, the cellulose ester film is stretched to 1.01 to 3.00 times in one direction.

Item 11. In the manufacturing method described in Item 10, in the stretching process, the cellulose ester film is stretched to 1.10 to 2.00 times in both a longitudinal direction and a lateral direction respectively.

Item 12. In the manufacturing method described in Item 9, the stretching process is conducted under a temperature of Tg to (Tg+50)° C., where Tg represents a grass transition temperature of the cellulose ester.

The present invention can provide optical film in which no luminous streaks due to die lines is observed nor light leakage is generated when it is observed on a liquid crystal display device.

DETAILED DESCRIPTION OF THE PREFERRED EMBODIMENT

In the following, this invention will be detailed.

In a preferable embodiment according to the present invention, a rolled optical film comprises a cellulose ester film which contains an organic solvent having a boiling point of not higher than 110° C. in an amount of less than 0.01 weight %, has a width of from 1 m to 3 m and a length of 500 m or more and is shaped in a rolled film;

wherein the cellulose ester film includes streaks from 1 line to 20 lines per 10 mm in a lateral direction thereof in which the streaks have a height of from 50 nm to 300 nm, an inclination of from 50 nm/mm to 300 nm/mm and a continuous length of 50 cm or more in a longitudinal direction thereof and the cellulose ester film does no includes a streak which has a height of 300 nm or more, an inclination of 300 nm/mm or more and a continuous length of 50 cm or more in a longitudinal direction thereof.

Optical film of this invention, which has a content of an organic solvent, a boiling point of which is not higher than 110° C., of less than 0.01 weight % can be prepared by a melt casting method. When cellulose ester film having the above-described streaks is prepared by a solution casting method, an effect of this invention cannot be achieved. In a solution casting method, an organic solvent having a boiling point of not higher than 110° C. is utilized with respect to drying efficiency, however, it cannot be avoided even after sufficient drying that a slight amount of the solvent remains when being wound in a roll form. The detailed reason why the effect cannot be achieved in a solution casting method is not clear, however, it is estimated to be due to an influence of this residual solvent.

Figure 1:
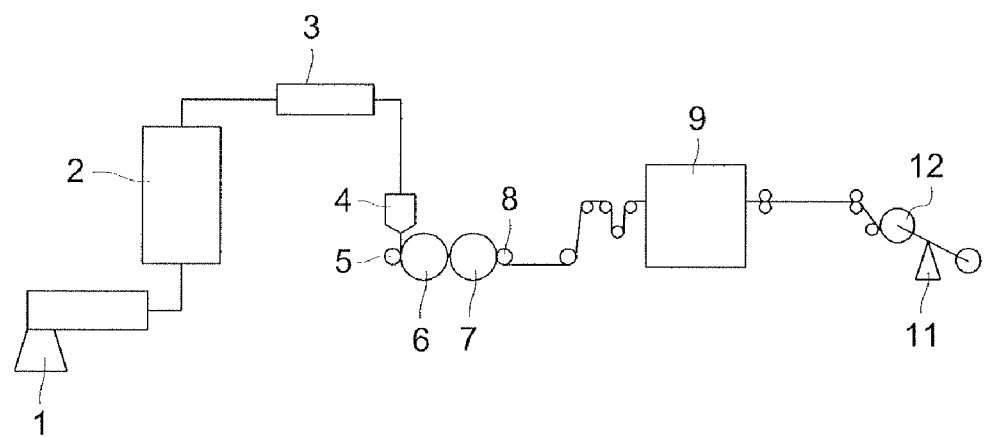
FIG. 1 is an illustrative drawing of an apparatus to manufacture optical film of this invention.

FIG. 1 is a drawing to explain an apparatus to manufacture an optical film based on a melt casting method. In FIG. 1, after mixing a film material containing a cellulose ester resin and additives, the mixed film is melted and extruded by an extruder 1. The extruded film material is filtered with a filter 2 so as to remove foreign materials. Incidentally, an additive can be added to the film material by a static mixer 3 and mixed uniformly in the film material. The melted film material prepared by the above processes is cast from a casting die 4 onto a first cooling roller 6 so as to form a melted film on the first cooling roller 6. The melted film is pressed onto the first cooling roller 6 by a touch roller 5 with a predetermined pressure. Further, the melted film is transferred and comes in contact with the outer periphery of a second cooling roller 7 so as to be cooled and solidified. Then, the solidified film is separated from the second cooling roller 7 by a separating roller 8. The separated web-shaped film is held with its both ends by a stretching device 9 and stretched in a lateral direction. Thereafter, the film is wound around a winding-up roll 12 by a winding-up device 11.

An organic solvent having a boiling point of not higher than 110° C. is not specifically limited, provided being an organic solvent which dissolve cellulose ester at ordinary temperature, and includes, for example, methylene chloride (boiling point of 39.8° C.) as an chlorine-containing organic solvent. A non-chlorine-containing organic solvent includes such as methyl acetate (boiling point of 56.9° C.), ethyl acetate (boiling point of 77.1° C.), acetone (boiling point of 56.1° C.), tetrahydrofuran (boiling point of 66° C.), 1,3-dioxolane (boiling point of 74° C.), 1,4-dioxane (boiling point of 101.1° C.), ethyl formate (boiling point of 53° C.), 2,2,2-trifluoroethanol (boiling point of 73.6° C.), 2,2,3,3-tetrafluoro-1-propanol (boiling point of 109° C.), 1,1,1,3,3,3-hexafluoro-2-methyl-2-propanol (boiling point of 60° C.), 1,1,1,3,3,3-hexafluoro-2-propanol (boiling point of 58° C.) and nitroethane (boiling point of 101.2° C.). It is most preferable not to contain these organic solvents.

The content of an organic solvent can be measured by a head space gas chromatography. That is, cellulose ester resin of a predetermined amount is heated in a closed vessel at 120° C. for 20 minutes, and the content of an organic solvent contained in the gas phase in the closed vessel is determined by gas chromatography. The content (%) of an organic solvent can be calculated from this result.

Content of organic solvent (%)=measured weight of organic solvent by gas chromatography (g)/cellulose ester resin before heat treatment (g)×100

In this invention, a streak refers a surface form along the width direction of cellulose ester film defined by height and inclination obtained by surface roughness meter measurement.

Rolled optical film of this invention has not less than 1 line and not more than 20 lines of streaks, which has a height of not less than 50 nm and not more than 300 nm, an inclination of not less than 50 nm/mm and not more than 300 nm/mm, and continuation of not less than 50 cm in the longitudinal direction, per 10 mm in the width direction. Further, it has no continuous streaks having a height of over 300 nm or an inclination of over 300 nm/mm.

As for a form and a number of streaks, it is preferable that the effect of this invention to generate no luminous streaks due to die lines nor light leakage can be efficiently achieved, by having streaks, which have a height of not less than 100 nm and not more than 200 nm, an inclination of not less than 100 nm/mm and not more than 300 nm/mm, and continuation in the longitudinal direction, of not less than 2 lines and not more than 10 lines per 10 mm in the width direction.

A form and a number of streaks can be measured by use of a surface roughness meter. Specifically, the measurement is performed by use of SV-3100S4 produced by Mitsutoyo Corp. at a scanning speed in the film width direction of 1.0 mm/sec while applying a weight of 0.75 mN, based on a measurement force, on a prove needle (a diamond needle) having a top form of 60° cone and a top curvature radius of 2 μm to determine cross-sectional curve at a Z axis (thickness direction) resolution of 0.001 μm. The measured result is schematically shown in FIG. 2.

Figure 2:
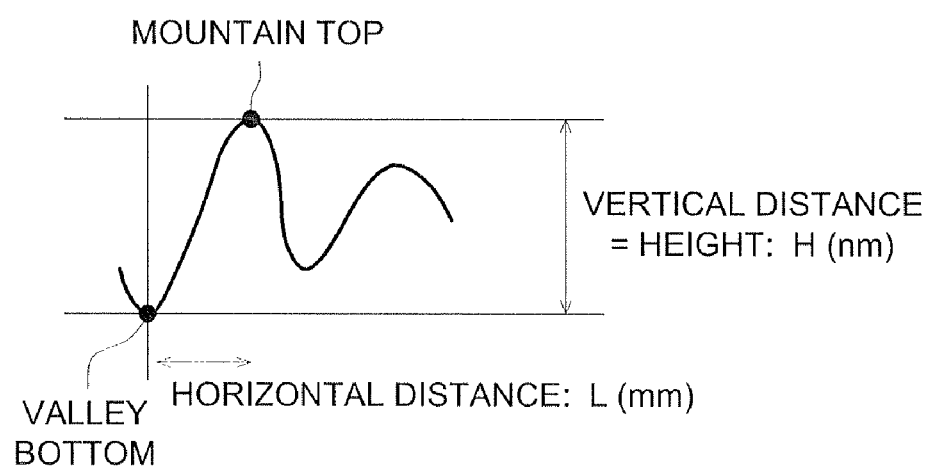
FIG. 2 is an illustrative drawing of a height and an inclination of streaks observed on the optical film surface.

As shown in FIG. 2, a height obtained from measurement by a surface roughness meter is a height from the valley bottom to the mountain top, which are adjacent to each other, and a vertical distance (H) between the mountain top and the valley bottom is read. Similarly, an inclination is a relationship of a horizontal distance (L) and a height (H) from the mountain top to the valley bottom, and is a value of a vertical distance (H) divided by a horizontal distance (L).

The number of streaks is determined by counting the number of streaks, having a predetermined height and inclination, in a range of each divided 10 mm, to determine an average over the whole width.

Luminous streaks due to die lines can be visually observed as a luminous streak form when the film is assembled into a liquid crystal display and an image is displayed. Further, evaluation of light leakage can be performed in the following manner. That is, supposing a state of optical film being wound in a rolled form, 5 sheets of optical film being accumulated, up and down sides of which were sandwiched by flat metal plates, were horizontally placed and a weight of 10 kg is applied thereon. After this state has been kept for 72 hours, the center sheet (the third sheet) of optical film is pasted up on a polarizer plate. This is assembled into a liquid crystal display device, and spot-wise or plane-wise luminance variation appeared in black display is visually observed.

By setting the form and number of streaks into the above-described range, an effect of this invention can be achieved when being wound in a roll form. It is preferable that an effect of this invention becomes specifically significant when cellulose ester film, having a width of not more than 1 m and not less than 3 m, a length of not less than 500 m and not more than 10000 m and a thickness of not less than 30 μm and not more than 100 μm, is wound on a core having a diameter of not less than 50 mm and not more than 500 mm.

Streaks of this invention is required to be continuous in the longitudinal direction, however, the continuousness cannot be generally defined because the continuousness differs in length depending on an image plane size; it is preferably not less than 50 cm or the maximum roll length in view of productivity, that is 10000 m, in the case of a large image plane TV application.

A method to generate streaks in a predetermined form and number is not specifically limited. For example, in the optical film manufacturing apparatus shown in FIG. 1, it can be generated by such a method to generate specific die lines by utilizing a casting die 4 having specific surface roughness at the time of casting the film, a method to generate streaks by arranging a member having a streak form at the outlet of a casting die 4, and a method to transfer grooves of a streak form on a support (first cooling roller 6, second cooling roller 7) by casting polymer on the support having grooves of a streak form. Further, it is preferred to press a touch roll 5 onto the film surface heated at not lower than Tg of the film and not higher than Tg+100° C. or to press a touch roll 5 onto the film surface having a temperature of not lower than Tg of the film and not higher than Tg+100° C., since the streak form can be precisely controlled. It is specifically preferred to press a touch roll 5 having a temperature of not lower than 10° C. and not higher than Tg−20° C. onto the film surface heated at not lower than Tg of the film and not higher than Tg+100° C. since streaks having an excellent form can be obtained. Further, it is also preferred to stretch film to control the form of streaks by the stretching device 9.

Further, in the case of heating the film surface or pressing a touch roll 5 onto film, it is preferred to winding turn the opposite surface of the film around transport rolls having a temperature of not higher than Tg−20° C. since film can be prevented from deformation due to a peeling force at the time of being peeled off from a transport roll as well as streaks can be formed without causing a problem such as transfer of roll contaminations.

Temperature of the film surface and that of the roll surface can be measured by a contact type thermometer or a non-contact type infrared thermometer, however, preferable is fixed point measurement by a non-contact type thermometer utilizing infrared rays.

As a means to heat one surface of film, it is preferred to heat by use of a non-contact type heating means from one surface side of the film. As a heating means, preferably utilized are such as a method to blow a hot wind, a method by use of an infrared or far infrared heater and a heating method by use of microwaves. Specifically preferable is a hot wind type or an infrared heater type which can heat only the neighborhood of the film surface. Further, also preferably utilized is a means to extrude melt polymer through a die in a film form by melt extrusion molding and to keep the surroundings warm not to cool the film surface.

Tg of film is a temperature at which the base line according to Tg or Tm by DSC measurement (temperature rising rate of 10° C./min) starts to change.

In the following, a casting method of film will be explained.

The condition of melt extrusion can be set similarly to that applied in other polymer such as polyethylene and polyester. For example, polymer having been dried by a dehumidified hot wind or under vacuum or reduced pressure is melt at an extrusion temperature of 200-300° C. by use of a uniaxial or biaxial type extruder, and after foreign matters having been eliminated by filtering through such as a leaf disc type filter, the melt polymer is cast in a film form through a T die to be solidified on a cooling drum. Introduction into extruder from a supply hopper is preferably performed under vacuum, or under a reduced pressure or inert gas atmosphere to prevent such as oxidative decomposition of polymer.

It is preferable to stably control the extrusion flow rate by utilizing such as a gear pump. Further, as a filter utilized for elimination of foreign matters, a stainless fiber sintered filter is preferably utilized. A stainless fiber sintered filter is comprised of a stainless fiber assembly having been made into a complex coiled state and compressed to sinter the contacting points resulting in one body, and the filtering precision is adjustable by varying a density depending on the fiber thickness and the compression amount. One in which coarse and dense filtering precisions are repeated plural times to make a multi-layered body is preferable. Further, it is preferable to make a filter having a composition of gradually increasing filtering precision or of repeating coarse and dense filtering precisions since a filter life is prolonged as well as capturing efficiency of foreign matters and gel is improved.

There is a case to generate a defect of a streak form when a flaw or a foreign matter is adhered on a die. Such a defect is also called as a die line, and it is preferable to make a structure having as small stagnant portion of resin as possible to minimize surface defects such as a die line. It is preferable to use a die having as minimum flaws as possible in the interior and on a lip of a die. It is preferable to suction the atmosphere containing volatile components since volatile components may precipitate at the die surrounding to cause a die line. Further, since precipitation may be caused also on an apparatus of such as an electrostatic applicator, it is preferable to prevent precipitation by applying alternate current or employing another heating means.

The inside surface of an extruder or a die which contacts with melt resin is preferably subjected to a surface treatment to be made barely adhere melt resin by decreasing the surface roughness or by utilizing a material having a low surface energy. Specifically, listed are those having been subjected to hard chromium plating or ceramic melt spattering are ground to make a surface roughness of not more than 0.2 S.

An additive such as a plastisizer may be mixed with resin in advance or may be kneading mixed in the way of an extruder. It is preferable to utilize a mixing device such as a static mixer for homogeneous addition.

Since roll contamination due to precipitation of volatile components in melt resin on the roll may become problematic when adhesion of melt film with a cooling drum is insufficient, it is preferable to employ such as a method to keep adhesion by electrostatic application, a method to keep adhesion by wind pressure, a method to keep adhesion by nipping the whole width or the edges, and a method to keep adhesion by reduced pressure.

As a touch roll, a roll provided with the metal, resin or ceramic surface is preferably utilized. It is specifically preferable to make the roll surface of a metal elastic body because adhesion can be achieved by a force being uniform in the width direction. As such a touch roll, utilized can be rolls described in such as JP-A 03-124425, 08-224772, 07-100960, 10-272676, 11-235747, WO 97-028950 and JP-A 2002-36332.

Further, it is preferable that die lines on the film surface can be made flat by setting the film temperature at the time of being nipped at not lower than Tg of the film and not higher than Tg+100° C. As a roll having an elastic surface and utilized for such a purpose, a roll well known in the art can be utilized. Rolls described in such as JP-A 03-124425, JP-A 08-224772, JP-A 07-100960, JP-A 10-272676, WO 97-028950, JP-A 11-235747 and JP-A 2002-36332 can be preferably utilized.

At the time of peeling off film from a cooling roll, it is preferable to control tension to prevent film from deformation.

In this invention, the film prepared in the above manner is preferably further stretched in at least one direction by 1.01-3.00 times. Sharpness of streaks is loosened by stretching to prepare film in a highly corrected state. It is preferable to stretch by 1.10-2.00 times in each of the both longitudinal (film transport direction) and lateral (width direction) directions.

As a method of stretching, a roll stretching machine and a tenter, which are well known in the art, can be suitably utilized. In the case of optical film being phase difference film, it is specifically preferable that accumulation with polarizer film can be performed in a roll form by making the stretching direction to be the width direction. The slow axis of optical film comprising polymer film becomes the width direction by being stretched in the width direction. On the other hand, also the transparent axis of polarizer film is generally the width direction. Excellent viewing angle can be obtained by assembling a polarizer plate, in which polarizer film and optical film are accumulated so that the transparent axis of the polarizer film and the slow axis of the optical film are parallel, in a liquid crystal display.

Further, in the case of utilizing optical film of this invention as phase difference film, temperature and magnification of stretching can be selected so as to achieve desired retardation characteristics. Generally, the stretching magnification is 1.1-3.0 times and preferably 1.2-1.5 times, and the stretching temperature is set generally in a range of Tg of resin constituting film—Tg+50° C., and preferably in a range of Tg–Tg+40° C. A desired retardation may not be obtained when the stretching magnification is too small, while film may be broken when it is too large. Film may be broken when the stretching temperature is too low, while a desired retardation may not be obtained when it is too high.

Stretching is preferably performed under a controlled and uniform temperature distribution. The temperature distribution is preferably within ±2° C., more preferably within ±1° C. and most preferably within ±0.5° C.

For the purpose of adjusting retardation or decreasing a dimension variation ratio of polymer film prepared in the above-described method, stretching or shrinking in the longitudinal direction or in the width direction may be performed. To shrink in the longitudinal direction, for example, there is a method to relax film in the longitudinal direction by temporarily clip out of the width stretching, or to shrink film by gradually decreasing the interval between clips adjacent to each other in a lateral stretching machine. The latter method can be practiced, utilizing an ordinary simultaneous biaxial stretching machine, by driving clip portions according to a pantograph method or a linear drive method to smoothly and gradually decrease the interval between clips adjacent to each other in the longitudinal direction. Shrinkage can be performed appropriately in combination with stretching in an arbitrary direction (the diagonal direction). The dimension variation ratio of optical film can be decreased by being shrunk by 0.5-10% either in the longitudinal direction or in the width direction.

The layer thickness of optical film differs depending on application purposes, however, as a finished film, the layer thickness range utilized in this invention is 30-200 μm, preferably 35-120 μm and specifically preferably 35-100 μm, in view of recent tendency of thinner film application. The average layer thickness of film can be adjusted by controlling such as an extrusion flow rate, a gap of a casting outlet of a die and a cooling drum speed so as to make a desired thickness.

Before winding up film, the edge portions are cut down by slitting to make the width of a product and a knurling process (an embossing process) may be applied on the both edges of film to prevent adhesion and abrasion marks at the center of a roll. To provide knurling, a metal ring, on the side surface of which is provided with a roughness pattern, is heated and pressed on film. Herein, since the clipped portion at the both edge portions of film is not usable as a product because of deformation of the film, it is cut out to be reused as a starting material.

In this invention, it is preferable that a variation ratio of retardation by humidity and a dimension variation ratio can be minimized by decrease of a free volume of the film.

To decrease a free volume, it is effective to heat treat film at a neighborhood of Tg of the film. The time of the heat treatment is preferably 1 second-1,000 hours at Tg−20° C. to Tg, because the effect is recognized from not shorter than 1 second and the effect increases the longer is the time, however, the effect saturates at approximately 1,000 hours. It is furthermore preferably 1 minute to 1 hour at Tg−15° C. to Tg. Further, it is preferable to heat treat film over a range of not lower than Tg to Tg−20° C. while being gradually cooled because an effect can be achieved in shorter time than to heat treat film at a constant temperature. The cooling rate is preferably from −0.1 to −20° C./sec and furthermore preferably from −1 to −10° C./sec. A method of the heat treatment is not specifically limited, and it can be performed by such as a tempered oven or a roll group, a hot wind, an infrared heater and a microwave heating device. Film may be heat treated while being transported or as either a sheet form or a rolled form. In the case of a treatment while being transported, film can be transported while being heat treated by use of a roll group or a tenter. In the case of treatment in a roll form, film is wound at a neighboring temperature of Tg and may be gradually cooled by being cooled as it is.

In the case that optical film of this invention is utilized for a VA mode liquid crystal panel, retardation in the film plane (Ro) is 20-200 nm and retardation in the thickness direction (Rt) is 90-400 nm; it is preferable that retardation in the film plane (Ro) is 20-100 nm and retardation in the thickness direction (Rt) is 90-200 nm. Further, the ratio of Rt to Ro (Rt/Ro) is preferably 0.5-2.5 and specifically preferably 1.0-2.0. Herein, Ro=(Nx−Ny)×dRt={(Nx+Ny)/2−Nz}×d, when a refractive index in the slow axis direction of film is Nx, a refractive index in the fast axis direction is Ny, a refractive index in the thickness direction is Nz and a layer thickness of film is d (nm).

The smaller is distribution of retardation, the better, and it is generally within ±10 nm, preferably within ±5 nm and more preferably within ±2 nm.

Uniformity of direction of the slow axis is also important and the distribution the angle against the film width direction is preferably in a range of −5-+5°, more preferably in a range of −1-+1° and specifically preferably in a range of −0.5-+0.5°. This distribution can be achieved by optimization of the stretching conditions.

As cellulose ester utilized in this invention, cellulose acetate propionate, cellulose acetate butyrate and cellulose acetate propionate butyrate are preferable. An acetyl substitution degree of the above-described cellulose ester is preferably at least not less than 1.5 because dimension stability of the prepared film is excellent. Measurement of a substitution degree of an acyl group of cellulose ester can be performed based on D-817-91 of ASTM. Molecular weight of cellulose ester is preferably 50,000-300,000 and specifically preferably 60,000-200,000, with respect to obtaining film having large mechanical strength.

In cellulose ester film of this invention, incorporated can be an additive such as a plastisizer, a stabilizer, a ultraviolet absorbent, an antioxidant, a matting agent, an antistatic agent, a non-flammable agent, dye and oil, for various purposes.

In this invention, cellulose ester film refers to cellulose ester film containing every element, including the above-described additives, which is necessary to exhibit the functions of film.

A plastisizer includes, for example, phosphoric ester type plastisizers such as triphenyl phosphate, tricresyl phosphate, cresyldiphenyl phosphate, octyldiphenyl phosphate, diphenylbiphenyl phosphate, trioctyl phosphate, tributyl phosphate, trinaphtyl phosphate, trixylyl phosphate, arylene bis (diaryl phosphate) ester and tricresyl phosphate; phthalic ester type plastisizers such as diethyl phthalate, dimethoxyethyl phthalate, dimethyl phthalate, dioctyl phthalate, dibutyl phthalate and di-2-ethylhexyl phthalate; glycolic ester type plasticizers such as triacetine, tributyline, butylphthalyl butylglycolate, ethylphthalyl ethylglycolate and methylphthalyl ethylglycolate; citric acid type plastisizers such as tributyl acetylcitrate; polyhydric alcohol ester type plastisizers such as dipropyleneglycol benzoate, tripropyleneglycol dibenzoate, 1,3-dibutyleneglycol dibenzoate, tetraethyleneglycol dibenzoate, trimethylolpropane triacetate, trimethylolpropane tribenzoate and trimethylolpropane tris(3,4,5-methoxy benzoate); amide type plastisizers such as N-butylbenzene sulfonamide; in addition to tris(2-ethylhexyl) trimellitate and caprolactone oligomer. At least two types among the above described plastisizers may be appropriately utilized in combination. An addition amount of these plastisizers is preferably 1-30% against polymer with respect to a balance between the effects of plastisizer and prevention of bleed out.

Further, such as polyester ether, polyester-urethane, polyester and polyether can be preferably incorporated because they can improve plasticity by blending.

As polyester ether, preferable is copolyester ether comprising aromatic dicarboxylic acid or alicyclic dicarboxylic acid, having a carbon number of 8-12 (such as terephthalic acid, isophthalic acid, naphthalene dicarboxilic acid and 1,4-cyclohexane dicarboxylic acid), aliphatic glycols or alicyclic glycols having a carbon number of 2-10 (such as ethylenediol, propylenediol, 1,4-butanediol, neopentyl glycol, 1,6-hexanediol, 1,4-hexanedimethanol and 1,5-pentanediol), and polyether glycols having 2-4 carbon atoms between the ether units (such as polytetramethylene ether glycol); and specifically comprising 1,4-cyclohexane dicarboxylic acid, 1,4-cyclohexane dimethanol and polytetramethylene ether glycol. A blending amount of polyester ether is preferably 5-30 weight % against primary polymer. By setting the blending amount into this range, film exhibiting an excellent plasticity can be prepared.

Polyester-urethane includes polyester-urethane prepared by a reaction of polyester and diisocyanato, and has a repeating unit represented by following general formula (1).

diisocyanato, p,p'-diphenylmethane diisocyanato and 1,5-naphthalene diisocyanato; and m-xylylene diisocyanato. Among them, preferable are tolylene diisocyanato, m-xylylene diisocyanato and tetramethylene diisocyanato because of excellent compatibility with cellulose ester when being made into polyurethane.

A weight average molecular weight of polyester-urethane is preferably 2,000-50,000 and more preferably 5,000-15,000. Polyester-urethane can be easily prepared by an ordinary synthesis method in which the above-described polyester and diisocyanato are mixed and heated with stirring. Further, polyester as a starting material can be easily synthesized either by a thermal melt condensation method based on an polyesterification reaction or an ester exchange reaction of corresponding dibasic acid or alkylesters thereof and glycols, or by a interfacial condensation method of acid chloride of these acids and glycols, with appropriately adjusting the terminal group to be a hydroxyl group.

The blending amount of polyester-urethane is preferably 5-30 weight % against the primary resin. By setting the blending amount into this range, film exhibiting an excellent plasticity can be prepared.

Formula (1)

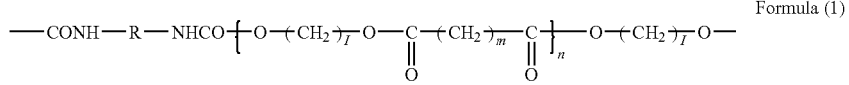

wherein, l is 2, 3 or 4; m is 2, 3 or 4; and n is 1-100. R is a structural unit shown below.

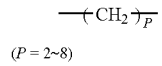

(P = 2~8)

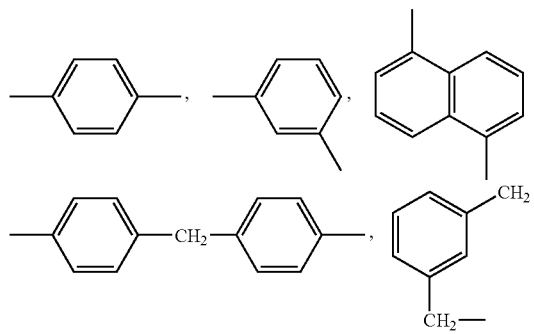

Polyester constituting polyester-urethene is polyester provided with ethylene glycol, 1,3-propanediol or 1,4-butanediol as a glycol component and the both terminal hydroxyl groups comprising succinic acid, glutaric acid or adipic acid as a dibasic acid component, and polymerization degree n is 1-100. A molecular weight of polyester is specifically preferably in a range of 1,000-4,500.

An diisocyanato component constituting polyester-urethane includes polymethylene isocyanato such as ethylene diisocyanato, trimethylene diisocyanato, tetramethylene diisocyanato and hexamethylene diisocyanato; aromatic diisocyanato such as p-phenylene diisocyanato, tolylene As polyester, preferable is polyester comprised of polyethylene glycol and aliphatic dibasic acid and preferably having a weight average molecular weight of 700-10,000. Polyethylene glycol is represented by a general formula of HO—$(CH_2CH_2-O)_n$—H (n is an integer), wherein n is preferably not more than 4. Aliphatic dibasic acid is such as oxalic acid, malonic acid, succinic acid or adipic acid which is represented by HOOC—R—COOH (R is an aliphatic divalent hydrocarbon group) as a general formula, and the carbon number is preferably not more than 9. Polyester can be easily synthesized either by a thermal melt condensation method based on an polyesterification reaction or an ester exchange reaction of the above-described dibasic acid or alkylester thereof and glycols, or by a interfacial condensation method of acid chloride of these acid and glycols.

The blending amount of polyester-urethane is preferably 5-30 weight % against the primary resin. By setting the blending amount in this range, film exhibiting an excellent plasticity can be prepared.

As an antioxidant, a hindered phenol type compound is suitable, and specific examples thereof include such as 2,6-di-t-butyl-p-cresol, pentaerythrityl-tetrakis[3-(3,5-di-t-butyl-4-hydroxyphenyl)propionate], triethyleneglycol-bis[3-(3-t-butyl-5-methyl-4-hydroxyphenyl) propionate], 1,6-hexanediol-bis[3-(3,5-di-t-butyl-hydroxyphenyl) propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene and tris-(3,5-di-t-butyl-4-hydroxybenzyl)-isocyanurate. Specifically preferable are 2,6-di-t-butyl-p-cresol, pentaerythrityl-tetrakis[3-(3,5-di-t-butyl-4-hydroxyphenyl)propionate] and tri-ethyleneglycol-bis[3-(3-t-butyl-5-methyl-4-hydroxyphenyl) propionate]. Further, for example, it is also preferable to utilize a hydrazine type metal inactivator such as N,N'-bis[3-

(3,5-di-t-butyl-4-hydroxyphenyl)propionyl]hydrazine or a phosphor type processing stabilizer such as tris(2,4-di-t-butylphenyl) phosphite in combination with the above described antioxidants because of stability improvement. An addition amount of these compounds is preferably 1 ppm-1.0% and specifically preferably 10-1,000 ppm based on a weight ratio against polymer, with respect to obtaining the effect.

A stabilizer includes an epoxy compound, an organic acid, a thioether compound and a phosphorous ester compound.

An epoxy compound has an effect to restrain generation of volatile components such as an organic acid in a melting process. An epoxy compound includes such as an alicyclic epoxy compound, a glycidyl ester compound, a glycidyl ether compound, a glycidyl amine compound and a long chain aliphatic epoxy compound. These epoxy compounds may be utilized alone or in combination of at least two types.

Specific examples of an alicyclic epoxy compound include such as vinylcyclohexene dioxide; cyclopentadiene oxide; epoxy-[epoxy-oxaspiroC8-15alkyl]cycloC5-12alkane such as 3,4-epoxy-1-[8,9-epoxy-2,4-dioxaspiro[5,5]undecane-3-yl]-cyclohexane; epoxy-C5-12cycloalkylC1-3alkyl-epoxyC5-12cycloalkanecarboxylate such as 3,4-epoxycyclohexylmethyl-3',4'-epoxycyclohexanecarboxylate and 4,5-epoxycyclooctylmethyl-4',5'-epoxycyclooctanecarboxylate; and bis(C1-3alkylepoxyC5-12cycloalkylC1-3alkyl)dicarboxylate such as bis(2-methyl-3,4-epoxycyclohexylmethyl) adipate.

Specific examples of an glycidyl ester compound include a saturated aliphatic carboxylic glycidyl ester such as acetic glycidyl ester, butyric glycidyl ester, lauric glycidyl ester, palmitic glycidyl ester and stearic glycidyl ester; aliphatic dicarboxylic diglycidyl ester such as adipic diglycidyl ester, dodecanic diglycidyl ester; an unsaturated aliphatic carboxylic glycidyl ester such as methacrylic glycidyl ester, oleic glycidyl ester and linoleic glycidyl ester; and aromatic carboxylic glycidyl ester such as benzoic glycidyl ester and phthalic diglycidyl ester. These glycidyl ester compounds may be utilized alone or in combination of at least two types.

A glycidyl ether compound includes bisphenol type epoxy resin (such as bisphenol A type epoxy resin, bisphenol F type epoxy resin, bisphenol AD type epoxy resin and bisphenol S type epoxy resin) and novolak type epoxy resin (such as phenol novolak type epoxy resin and cresol novolak type epoxy resin).

Specific examples of a glycidyl amine compound include tetraglycidyl aminodiphenylmethane, triglycidyl aminophenol, diglycidyl aniline and diglycidyl toluidine.

Specific examples of a long chain aliphatic epoxy compound include epoxydated fat and oil such as epoxydated soy bean oil, epoxidated castor oil and epoxydated linseed oil; epoxydated aliphatic alkyl such as epoxydated butyl stearate and epoxydated octyl stearate; epoxidated polybutadiene and long chain α-olefin oxide.

Among these epoxy compounds, preferable are an alicyclic epoxy compound and long chain aliphatic epoxy compound, specifically epoxyC5-12cycloalkylC1-3alkyl-epoxyC5-12cycloalkanecarboxylate such as 3,4-epoxycyclohexylmethyl-3',4'-epoxycyclohexanecarboxylate and 4,5-epoxycyclooctylmethyl-4',5'-epoxycyclooctanecarboxylate; and epoxydated oil and fat such as epoxydated soy bean oil.

The blending amount of an epoxy compound is preferably 0.05-5 weight % and more preferably 0.5-3 weight %, against polymer with respect to a restraining effect of an organic acid.

An organic acid, a thioether compound and a phosphorous ester compound are provided with an anti-oxidation effect and a thermal stability enhancing effect, and have an effect to restrain generation of an organic acid due to coloring and decomposition of resin. These stabilizers can be utilized alone or in combination of at least two types.

As an organic acid, an organic acid having a pKa value of not less than 1 and preferably not less than 2 is preferable and listed are aliphatic carboxylic acid such as formic acid, acetic acid, propionic acid, butyric acid, capric acid, oxalic acid, malonic acid, succinic acid, glutaric acid, adipic acid, sebacic acid, maleic acid, fumaric acid, itaconic acid and sorbic acid; alicyclic carboxylic acid such as cyclohexane carboxylic acid, 1,4-cyclohexane dicarboxylic acid and tetrahydrophthalic acid; aromatic carboxylic acid such as benzoic acid, naphthoic acid, phthalic acid and trimellitic acid; aliphatic oxycarboxylic acid such as glycolic acid, lactic acid, oxybutyric acid, glyceric acid, tartaric acid, citric acid and malic acid; aromatic oxycarboxylic acid such as salicylic acid, oxybenzoic acid and gallic acid; heterocyclic carboxylic acid such as pyridine carboxylic acid; and aromatic sulfonic acid such as benzene sulfonic acid and toluene sulfonic acid. These organic acids may be anhydride or hydride.

Among these organic acid, preferable are aliphatic saturated carboxylic acid such as acetic acid, propionic acid, oxalic acid and malonic acid; aliphatic unsaturated carboxylic acid such as maleic acid and fumaric acid; aliphatic oxycarboxylic acid such as glycolic acid, lactic acid, citric acid and malic acid and specifically preferable are aliphatic oxycarboxylic acid having a carbon number of 2-6 such as citric acid and hydride thereof.

The addition amount of an organic acid is preferably 0.005-0.5 weight % and more preferably 0.01-0.1 weight % against polymer to obtain a sufficient anti-oxidation effect.

A thioether compound includes dialkylthiodicarboxylate such as dilauryl-3,3'-thiodipropionate, ditridecyl-3,3'-thiodipropionate, dimyristic-3,3'-thiodipropionate, dipalmityl-3,3'-thidipropionate, distearyl-3,3'-thiodipropionate, laurylstearyl-3,3'-thiodipropionate and palmitylstearyl-3,3'-thiodipropionate.

Among these thioether compounds, preferable are dilauryl-3-3'thiodipropionate, dimyristyl-3,3'-thiodipropionate and distearyl-3,3'-thiodipropionate.

The addition amount of a thioether compound is preferably 0.01-5 weight % and more preferably 0.1-1 weight % against polymer to obtain a sufficient anti-oxidation effect.

A phosphorous ester compound has an excellent effect to improve heat resistance and is effective in the case of melting polymer at high temperature. Listed are diarylalkyl phosphite such as triphenyl phosphite, tricresyl phosphite, trixylenyl phosphite and trinaphthyl phosphite; aryldialkyl phosphite such as phenyldiisooctyl phosphite; trialkyl phosphite such as trimethyl phosphite, triethyl phosphite, tri-n-butyl phosphite, triisooctyl phosphite, tridecyl phosphite and triisodecyl phosphite; dialkyl phosphite such as dilauryl phosphite; phosphite containing an alkylaryl unit such as tris(2,4-t-butylphenyl) phosphite, tris(nonylphenyl)phosphite, tris(dinonylphenyl) phosphite, dinonylphenyl-o-biphenyl phosphite and 2,2-methylenebis(4,6-di-t-butylphenyl)octylphosphite; aliphatic carboxylic phosphorous ester such as trisstearyl phosphite; phosphite containing an alkyleneoxide unit such as polypropyleneglycol nonylphenyl phosphite; phosphite containing a cyclic neopentane unit such as cyclicneopentanetetrabis(2,6-di-t-butylphenyl)phosphate and cyclicneopentanetetrabis(2,6-t-butyl-4-methylphenyl)phosphate; diphosphites such as diisodecylpentaerythritol diphosphite, didodecylpentaerythritol diisocyanate, 4,4'-isopropylidenediphenyl didodecyldiphosphite; triphosphites such as heptacisdipropyleneglycol triphosphite and hexa•tridecyl-1,1,3-tri(3-t-butyl-6-methyl-4-oxyphenyl)-3-methylpropane triphosphite.

Among these phosphorous ester compounds, phosphite containing a branched alkyl group is preferable with respect to excellent thermal stability improvement effect, and listed are such as triisodecyl phosphite, tris(2,4-t-butylphenyl) phosphite and 2,2-methylenebis(4,6-di-t-butylphenyl)octylphosphite.

The addition amount of a phosphorous ester compound is preferably 0.01-5 weight % and more preferably 0.1-1 weight % against polymer.

An ultraviolet absorbent utilizable in this invention includes such as an oxybenzophenone type compound, a benzotriazole type compound, a salicylic ester type compound, a benzophenone type compound, a cyanoacrylate type compound and a nickel complex type compound, however, preferable is a benzotriazole type compound which shows less coloring. Further, ultraviolet absorbents described in JP-A 10-182621 and JP-A 8-337574, polymer ultraviolet absorbents described in JP-A 6-148430 are also preferably utilized. As an ultraviolet absorbent, preferable are those being excellent in absorption ability of ultraviolet rays of not longer than 370 nm with respect to prevention of degradation of a polarizer element and liquid crystal as well as having less absorption of visible light of not shorter than 400 nm with respect to liquid crystal display ability. Specific examples of an ultraviolet absorbent useful for this invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-butylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-5'-methylphenyl)-5-chlorobenzotriazole, 2-(2H-benzotriazole-2-yl)-6-(straight chain and branched dodecyl)-4-methylphenol and a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, however, are not limited thereto. Further, as products available on the market, Tinuvin 109, Tinuvin 171 and Tinuvin 326 (all are manufactured by Ciba Specialty Chemicals Co., Ltd.) can be preferably utilized.

Specific examples of a benzophenone type compound include such as 2,4-dihydroxybenzophenone, 2,2'-dihydroxy-4-methoxybenzophenone, 2-hydroxy-4-methoxy-5-sulfobenzophenone and bis(2-methoxy-4-hydroxy-5-benzoyphenylmethane), however, are not limited thereto.

The blending amount of these ultraviolet absorbents is preferably in a range of 0.01-10 weight % and more preferably of 0.1-5 weight %, against polymer. An effect of ultraviolet absorption may be insufficient when the using amount is too small, while transparency of film may be deteriorated when it is too large. An ultraviolet absorbent is preferably provided with high thermal stability.

In this invention, micro-particles may be incorporated to provide film with a sliding property. Micro-particles utilized in this invention may be either an inorganic compound or an organic compound provided that the micro-particles do not deteriorate transparency of prepared film and are heat resistant at the time of melting, and include such as talc, mica, zeolite, diatomaceous earth, calcinated diatomaceous earth, kaolin, sericite, bentonite, smectites, cray, silica, quartz powder, glass beads, glass powder, glass flake, milled fiber, warastnite, boron nitride, boron carbide, boron titanate, magnesium carbonate, heavy calcium carbonate, light calcium carbonate, calcium silicate, aluminum silicate, magnesium silicate, magnesium aluminosilicate, alumina, zinc oxide, titanium dioxide, iron oxide, magnesium oxide, zirconium oxide, aluminum hydroxide, calcium hydroxide, magnesium hydroxide, calcium sulfate, barium sulfate, silicon carbide, aluminum carbide, titanium carbide, aluminum nitride, silicon nitride, titanium nitride and white carbon. These microparticles may be utilized alone or in combination of at least two types. It is possible to highly balance transparency and a sliding property by utilizing particles having different particle sizes and forms (for example, a needle form and a spherical form) in combination.

Among these, silicon dioxide, which is excellent in transparency (haze) due to the refractive index near to that of polymer, is preferably utilized. As specific examples of silicon dioxide, preferably utilized can be products available on the market under the name of such as AEROSIL 200V, R972V, R972, R974, R812, 200, 300, R202, OX50 and TT600, AEROSIL RY50, AEROSIL NY50, AEROSIL RY200, AEROSIL RY200S, AEROSIL RX50, AEROSIL NA50, AEROSIL RX200, AEROSIL RX300, AEROSIL R504, AEROSIL DT4, AEROSIL LE1, AEROSIL LE2, (manufactured by Nippon AEROSIL Co., Ltd.), SEAHOSTAR KEP-10, KEP-30 and KEP-50 (manufactured by Nippon Shokubai Co., Ltd.), SYROHOBIC 100 (manufactured by Fuji Silycia Chemical Ltd.), NIPSEAL E220A (manufactured by Nippon Silica Industry) and ADMAFINE SO (manufactured by Admatechs). As for a form of particles, any of an irregular form, a needle form, a flat form and a spherical form can be utilized without specific limitation; however, a spherical form is specifically preferable because transparency of the prepared film becomes excellent. The size of particles is preferably not more than a wavelength of visible light and more preferably not more than ½ of a wavelength of visible light because light will be scattered when the size is near to a wavelength of visible light to make transparency poor. The particle size is specifically preferably in a range of 80-180 nm since a sliding property may not be improved when the size is excessively small. Herein, the particle size means the size of aggregate when the particles are constituted of aggregate of primary particles. Further, particle size means a diameter of an equivalent circle of the projected area when particles are not spherical.

Optical film prepared according to this invention can be made into an elliptic polarizer plate by being pasted on at least one surface of polarizer film.

Polarizer film is comprised of film capable of being stretched and oriented such as polyvinyl alcohol film which has been treated with dichroic dye such as iodine and longitudinally stretched. Since polarizer film itself is not provided with sufficient strength and durability, cellulose triacetate film having no anisotropy as protective film is adhered on the both sides thereof to make a polarizer plate. Optical film prepared by this invention is useful as the above-described protective film. Further, optical film of this invention, in the case of being provided with phase difference, may be utilized by being pasted on a polarizer plate or by being pasted directly on polarizer film to function also as protective film.

A polarizer plate may be an adhesive type (being able to be pasted on such as a liquid crystal cell by peeling off a peelable sheet) in which a peelable sheet is accumulated on one or the both surfaces of the polarizer plate via a pressure-sensitive adhesive layer (such as an acryl type pressure-sensitive adhesive layer).

A polarizer plate of this invention prepared in this manner can be utilized in various types of display devices. In particular, it is utilized in a liquid crystal display employing a VA mode liquid crystal cell in which liquid crystal molecules are practically vertically aligned at the time without voltage application.

EXAMPLES

In the following, this invention will be detailed with reference to examples.

Example 1

A mixture of cellulose acetate propionate, which had been vacuum dried at 80° C. for 12 hours (a moisture ratio of 100 ppm) and had an acetyl group substitution degree of 1.95, a propionyl group substitution degree of 0.7 and a number average molecular weight of 60,000, of 100 weight parts, 10 weight parts of trimethylolpropane tribenzoate, 1.0 weight parts of TINUVIN 326, 0.1 weight part of 2,6-di-t-butyl-p-cresole, 0.1 weigh part of pentaerythrityl-tetrakis[3-(3,5-di-t-butyl-4-hydroxyphenyl)propionate] and 0.1 weight part of triisodecyl phosphite was melting mixed at 235° C. to be pelleted by use of a biaxial type extruder. At this time, not a kneading disc but a screw of an all screw type was utilized to depress heating due to sharing at the time of kneading. Further, vacuum suction through a vent was performed to suctioning remove volatile components generated during kneading. Herein, a feeder and a hopper to supply the mixture to an extruder and the midway from an extruder die to a cooling bath were kept under a dry nitrogen gas atmosphere to prevent moisture sorption by resin. Glass transition temperature Tg of this resin composition was 136° C.

This pellet (moisture content of 80 ppm) was melting extruded at a melting temperature of 250° C. in a film form on the first roll having a surface temperature of 100° C. from a T die to prepare roll form non-stretched film having a length of 600 m and a width of 1 m. At this time, a T die having surface roughness Ra of the rip portion of 0.1 μm was utilized. Further, the surface of the film on the first roll was pressed by a touch roll having a metal surface at a line pressure of 10 kN/m.

The prepared film was introduced in a tenter having a stretching zone, a holding zone and a cooling zone (also provided with a neutral zone between each zone to assure inter-zonal heat insulation), being cooled down to 30° C. while being relaxed in the width direction by 3% after having been stretched in the width direction by 1.3 times at 60° C., followed by being released from clips and the clip held portion was cut down, whereby optical film having a length of 550 m, a width of 1 m and a layer thickness of 80 μm was prepared. At this time, bowing phenomenon due to stretching was prevented by adjusting a preheating temperature and a holding temperature. No residual solvent was detected from the prepared film.

With respect to the prepared optical film, performed were evaluations of a form (height and inclination) and a number of streaks, measurement of Ro and Rt, and luminous streaks and light leakage when being observed on a liquid crystal display. The results are shown in table 1.

(Streak Height, Inclination, Number of Lines)

The form and number of streaks were measured by use of a surface roughness meter. Specifically, a cross-sectional curve is measured at a resolution of 0.001 μm while applying a weight of a measurement force of 0.75 mN on a proving needle (a diamond needle) having a top form of 60° cone and a top curvature radius of 2 μm by use of SV-3100S4 produced by Mitsutoyo Co., Ltd.

The length of a streak is read as a vertical distance from the mountain top to the valley bottom. The inclination of a streak is determined by reading a horizontal distance (L) from the mountain top to the valley bottom and dividing the vertical distance (H) by the horizontal distance (L).

Herein, the streak height and the streak inclination each are represented by the average values of the heights and inclinations of predetermined streaks existing all over the width of film, respectively.

A number of streaks is determined as an average of streaks all over the width by counting the number of streaks having a predetermined height and inclination existing in every divided region of 10 mm.

This height, inclination and number of streaks were measured at 50 cm intervals along the longitudinal direction of rolled film and the averages were designated as the final streak height, streak inclination and streak number.

Herein, since streaks having a height of not more than 50 nm and an inclination of not more than 50 nm/mm showed significant measurement error, these were not counted as specific values.

(Ro, Rt)

With respect to the prepared film, Ro and Rt at 10 points along the width direction were measured in the following manner and were represented by the average values, respectively.

Three dimensional refractive index measurement was performed at a wavelength of 590 nm under an atmosphere of 23° C., 55% RH by use of an automatic double refractometer KOBRA-21ADH (produced by Oji Scientific Instruments) to determine refractive index Nx in the slow axis direction, refractive index Ny in the fast axis direction and refractive index Nz in the thickness direction. Retardation in the thickness direction (Rt) and retardation in the plane direction (Ro) were calculated according to the following equation. $Ro=(Nx-Ny) \times d$ $Rt=\{(Nx+Ny)/2-Nz\}$, wherein a refractive index in the slow axis direction is Nx, a refractive index in the fast axis direction is Ny, a refractive index in the thickness direction is Nz and a layer thickness of film is d (nm).

(Luminous Streak)

Five sheets of optical film having been cut out into A4 size were accumulated, up and down sides of which were sandwiched by metal plates, to be horizontally placed, and a weight of 10 kg was applied thereon. The weight was removed after this state had been kept for 72 hours at 23° C., 55% RH, and the center (the third sheet) optical film was pasted on a polarizer plate. The resulting product was assembled into a liquid crystal display and an image was displayed. The luminous streaks due to streaks were visually observed to be ranked based on the following criteria.

| Rank | Criteria |
| --- | --- |
| A: | No streaks are observed. |
| B: | Slight streaks are partly observed. |
| C: | Slight streaks are observed all over the image. |
| D: | Distinct steaks are partly observed. |
| E: | Distinct streaks are observed all over the image |

(Light Leakage)

Five sheets of optical film having been cut out into a A4 size were accumulated, up and down sides of which were sandwiched by metal plates, to be horizontally placed, and a weight of 10 kg was applied thereon. The weight was removed after this state had been kept for 72 hours at 23° C., 55% RH, and the center (the third) optical film was pasted on a polarizer plate. The resulting product was assembled into a liquid crystal display and luminous variation appeared spot-wise or plane-wise in black display was visually observed, which was ranked based on the following criteria.

| Rank | Criteria |
|------|----------|
| A:   | A uniform black view with no light leakage is observed. |
| B:   | Slight luminous variation is partly observed. |
| C:   | Slight luminous variation is observed all over the image. |
| D:   | Luminous variation is partly observed. |
| E:   | Luminous variation is observed all over the image |

Example 2

Rolled optical film having a length of 550 m, a width of 1.1 m and a thickness of 80 μm was prepared in a similar manner to example 1, except that the line pressure of a touch roll was set to 5 kN/m and a stretching magnification was set to 1.5 times.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Example 3

Rolled optical film, having a length of 550 m, a width of 1.1 m and a thickness of 80 μm, was prepared in a similar manner to example 1, except that the line pressure of a touch roll was set to 20 kN/m.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Comparative Example 1

Rolled optical film, having a length of 550 m, a width of 1.1 m and a thickness of 80 μm, was prepared in a similar manner to example 1, except that no touch rolls were utilized.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Example 4

Rolled optical film, having a length of 550 m, a width of 1.1 m and a thickness of 80 μm, was prepared in a similar manner to example 1, except that a T die having rip mean surface roughness Ra of 0.05 μm was utilized.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Example 5

Rolled optical film, having a length of 550 m, a width of 1.1 m and a thickness of 80 μm, was prepared in a similar manner to example 1, except that the line pressure of a touch roll was set to 3 kN/m.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Comparative Example 2

Rolled optical film, having a length of 550 m, a width of 1.1 m and a thickness of 80 μm, was prepared in a similar manner to example 4, except that the line pressure of a touch roll was set to 20 kN/m and a stretching magnification was set to 1.5 times.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1. In this Comparative Example 2, streaks having a height smaller than 50 nm were observed, however, streaks having a height of 50 nm or more were not observed.

Example 6

Rolled optical film, having a length of 550 m, a width of 1.1 m and a thickness of 80 μm, was prepared in a similar manner to example 1, except that the line pressure of a touch roll was set to 15 kN/m and a stretching magnification was set to 1.5 times.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Comparative Example 3

Rolled optical film, having a length of 550 m, a width of 1.1 m and a thickness of 80 μm, was prepared in a similar manner to example 1, except that the line pressure of a touch roll was set to 5 kN/m and a stretching magnification was set to 1.1 times.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Comparative Example 4

Rolled optical film, having a length of 550 m, a width of 1.1 m and a thickness of 80 μm, was prepared in a similar manner to example 1, except that a T die having rip mean surface roughness Ra of 0.3 μm was utilized.

With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

Example 7

Rolled optical film, having a length of 550 m, a width of 1.1 m and a thickness of 80 μm, was prepared in a similar manner to Example 5, except that a stretching magnification was set to 1.2 times.

With respect to the prepared film, measurement of a streak form (height, inclination) and a number of streaks, Ro and Rt, and evaluations of luminous streaks and light leakage when being observed on a liquid crystal display, in a similar manner to Example 1. The results are shown in table 1.

Example 8

Rolled optical film, having a length of 550 m, a width of 1.1 m and a thickness of 80 μm, was prepared in a similar manner to Example 1, except that a line pressure of a touch roll was set to 5 kN/m.

With respect to the prepared film, measurement of a streak form (height, inclination) and a number of streaks, Ro and Rt, and evaluations of luminous streaks and light leakage when being observed on a liquid crystal display, in a similar manner to Example 1. The results are shown in table 1.

Example 9

Rolled optical film, having a length of 550 m, a width of 1.1 m and a thickness of 80 μm, was prepared in a similar manner to Example 1, except that a line pressure of a touch roll was set to 12 kN/m.

With respect to the prepared film, measurement of a streak form (height, inclination) and a number of streaks, Ro and Rt, and evaluations of luminous streaks and light leakage when being observed on a liquid crystal display, in a similar manner to Example 1. The results are shown in table 1.

Example 10

Rolled optical film, having a length of 550 m, a width of 1.1 m and a thickness of 80 μm, was prepared in a similar manner to Example 5, except that a line pressure of a touch roll was set to 2 kN/m and a stretching magnification was set to 1.2 times.

With respect to the prepared film, measurement of a streak form (height, inclination) and a number of streaks, Ro and Rt, and evaluations of luminous streaks and light leakage when being observed on a liquid crystal display, in a similar manner to Example 1. The results are shown in table 1.

Comparative Example 5

Rolled optical film, having a length of 550 m, a width of 1.1 m and a thickness of 80 μm, was prepared in a similar manner to example 1, except that a touch roller was not used and a stretching magnification was set to 1.5 times. With respect to the prepared film, measurement of a streak form (height, inclination) and a number of streaks, Ro and Rt, and evaluations of luminous streaks and light leakage when being observed on a liquid crystal display, in a similar manner to example 1. The results are shown in table 1.

Comparative Example 6

Rolled optical film, having a length of 550 m, a width of 1.1 m and a thickness of 80 μm, was prepared in a similar manner to example 1, except that the line pressure of a touch roll was set to 5 kN/m and a stretching magnification was set to 1.2 times. With respect to the prepared film, measurement of a form (height, inclination) and a number of streaks, Ro and Rt, and evaluations of luminous streaks and light leakage when being observed on a liquid crystal display, in a similar manner to example 1. The results are shown in table 1.

TABLE 1

| | Number of steaks | | | | | Luminous | Light |
|---|---|---|---|---|---|---|---|
| | A | b | C | Ro nm | Rt nm | streaks Rank | leakage Rank |
| | Lines/10 mm | | | | | | |
| Example 1 | 10 | 8 | 0 | 50 | 120 | A | A |
| Example 2 | 8 | 3 | 0 | 55 | 110 | A | A |
| Example 3 | 3 | 0 | 0 | 50 | 120 | A | B |
| Example 4 | 6 | 1 | 0 | 50 | 120 | A | A |
| Example 5 | 5 | 0 | 0 | 50 | 120 | B | A |
| Example 6 | 18 | 10 | 0 | 50 | 120 | B | B |
| Example 7 | 10 | 0 | 0 | 50 | 120 | A | A |
| Example 8 | 15 | 12 | 0 | 50 | 120 | A | B |
| Example 9 | 8 | 8 | 0 | 50 | 120 | A | A |
| Example 10 | 15 | 0 | 0 | 50 | 120 | A | B |
| Comparative example 1 | 30 | 10 | 2 | 50 | 120 | E | C |
| Comparative example 2 | 0 | 0 | 0 | 50 | 120 | D | E |
| Comparative example 3 | 25 | 8 | 0 | 55 | 115 | D | D |
| Comparative example 4 | 7 | 3 | 1 | 50 | 120 | E | B |
| Comparative example 5 | 18 | 8 | 2 | 55 | 115 | E | C |
| Comparative example 6 | 22 | 13 | 0 | 45 | 120 | E | D |

A: Streaks having a height of 50-300 nm and an inclination of 50-300 nm/mm
b: Streaks having a height of 100-200 nm and an inclination of 100-300 nm/mm
C: Streaks having a height of over 300 nm and an inclination of over 300 nm/mm

Example 11

Polyvinyl alcohol film having a thickness of 120 μm was immersed in 100 weight parts of an aqueous solution containing 1 weight part of iodine and 4 weight parts of boric acid and stretched at 50° C. by 4 times, whereby polarizer film having a length of 550 m and a width of 1 m was prepared.

Next, optical film prepared in example 4, after having been immersed in a sodium hydroxide aqueous solution having a concentration of 2 mol/l for 2 minutes at 60° C., was dried at 100° C. for 10 minutes, being subjected to an alkaline saponification treatment, and the resulting film was pasted on the both sides of polarizer film in a roll-to-roll manner by use of an adhesive comprising a 5% completely saponificated polyvinyl alcohol aqueous solution, whereby a polarizer plate was prepared.

One surface side of the prepared polarizer plate (the surface of optical film of example 4) was subjected to a corona discharge treatment at a treatment amount of 50 dyn/cm followed by being accumulated with an adhesive layer, and the resulting plate was aged for 1 week at ordinary temperature. An adhesive layer has been prepared by coating a solution, comprising 99.9 weight parts of an acrylic ester type adhesive (the ratio of butyl acrylate to acrylic acid is 95/5) mixed with 0.1 weight part of trimethylolpropane tolylene diisocyanato as a cross-linking agent, on a peelable film (polyethylene terephthalate film, having a thickness of 38 μm, one surface of which has been subjected to a silicone treatment), followed by being dried.

Figure 3:
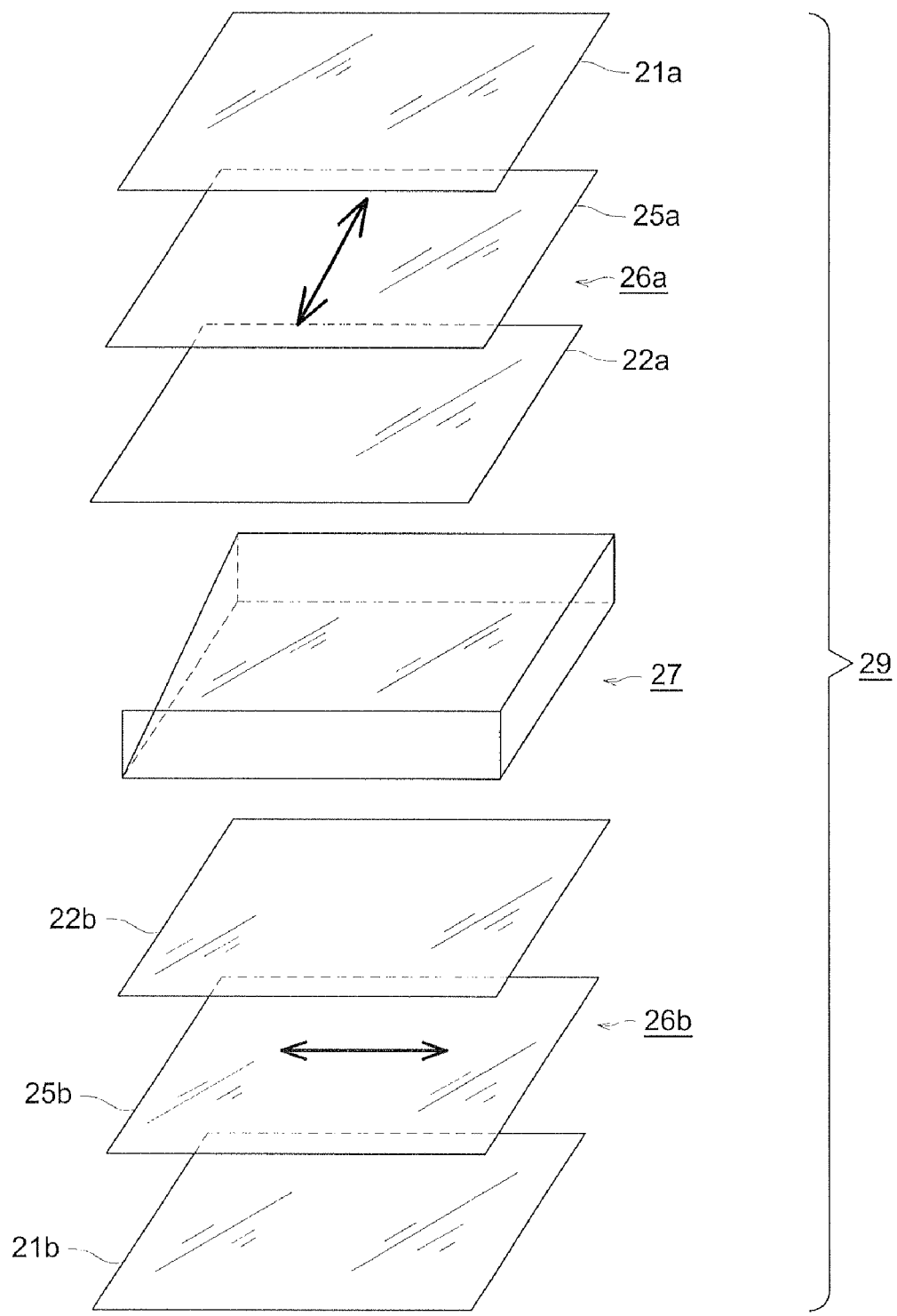
FIG. 3 is a perspective view showing an outline of a structure of a liquid crystal display device.

Herein, in the above-described polarizer plate preparation, the width direction of optical film and the transparent direction of polarizer film were pasted up to become parallel. FIG. 3 is a perspective view showing an outline of a structure of a liquid crystal display section 29, and the liquid crystal display section 29 comprises a observation side polarizing plate 26a, a vertical alignment type liquid crystal cell 27 and a backlight side polarizing plate 26a. Further, the polarizing plate 26a includes a polarizer 25a and optical films 21a, 22a pasted on both sides of the polarizer 25a and the polarizing plate 26b includes a polarizer 25b and optical films 21b, 22b pasted on both sides of the polarizer 25b. In Example 11, in the above structure, the optical film obtained in Example 4 was used as the optical films 21a, 22a and the optical films 21b, 22b.

When viewing angle characteristics were evaluated in the following manner utilizing the polarizing plate prepared in Example 11 with the liquid crystal display device 29, a clear image was observed and excellent viewing angle was confirmed.

(Viewing Angle Characteristics)

Utilizing a liquid crystal display, in which a polarizer plate of a liquid crystal display (VL-1530S, manufactured by Fujitsu Ltd.) employing a vertical alignment type liquid crystal cell was peeled off, a polarizer plate prepared in the example was pasted up instead thereof so as to make the transparent axis of the observer side polarizer plate becomes the up-and-down direction and the transparent axis of the back light side polarizer plate becomes the left-and-right direction, images were observed visually from the direction inclined by 80° against the normal line and evaluated.

This invention can provide optical film in which no luminous streaks due to die lines is observed nor light leakage is generated, even when a melt extrusion molding method is employed. By applying optical film prepared by a manufacturing method of this invention in a liquid crystal display, a liquid crystal display having excellent viewing angle characteristics can be achieved.

What is claimed is:

1. A rolled optical film, comprising:
a cellulose ester film having a width of from 1 m to 3 m and a length of 500 m or more and shaped in a rolled film;
wherein the entire surface of the cellulose ester film is shaped so that the cellulose ester film has from 1 to 20 continuous streaks per 10 mm in a lateral direction on a whole surface thereof in which the continuous streaks have a height of from 50 nm to 300 nm, an inclination of from 50 nm/mm to 300 nm/mm and a continuous length of 50 cm or more in a longitudinal direction thereof, and the cellulose ester film does not have, on the whole surface thereof, any streaks which have a height of over 300 nm, an inclination of over 300 nm/mm and a continuous length of 50 cm or more in a longitudinal direction thereof.

2. The rolled optical film of claim 1, wherein the cellulose ester film has from 2 to 10 of the continuous streaks having a height of from 100 nm to 200 nm.

3. The rolled optical film of claim 1, wherein the cellulose ester film has a thickness of from 30 μm to 200 μm.

4. The rolled optical film of claim 1, wherein the cellulose ester film contains one of cellulose acetate propionate, cellulose acetate butyrate and cellulose acetate propionate butyrate.

5. The rolled optical film of claim 1, wherein the cellulose ester film contains an organic solvent having a boiling point of not higher than 110° C. in an amount of less than 0.01 weight %.

6. The rolled optical film of claim 5, wherein the cellulose ester film does not contain the organic solvent.

7. A polarizing plate, comprising:
an optical film obtained from the rolled optical film described in claim 1 as a protective film.

8. A liquid crystal display device, comprising:
the polarizing plate described in claim 7.

9. A manufacturing method of manufacturing a rolled optical film, comprising:
a casting process of extruding a cellulose ester resin melted by heat on a support from an extruder so as to cast the melted cellulose ester resin onto a support;
a pushing process of pushing a touch roll onto a cellulose ester film formed on the support;
a separating process of separating the cellulose ester film from the support;
a stretching process of stretching the separated cellulose ester film with a stretching device; and
a winding process to wind the cellulose ester film into a rolled optical film having a width of from 1 m to 3 m and a length of 500 m or more;
wherein the entire surface of the cellulose ester film is shaped so that the cellulose ester film of the rolled optical film has from 1 to 20 continuous streaks per 10 mm in a lateral direction thereof in which the continuous streaks have a height of from 50 nm to 300 nm, an inclination of from 50 nm/mm to 300 nm/mm and a continuous length of 50 cm or more in a longitudinal direction thereof and the cellulose ester film does not have, on the whole surface thereof, any streaks which have a height of 300 nm or more, an inclination of 300 nm/mm or more and a continuous length of 50 cm or more in a longitudinal direction thereof.

10. The manufacturing method of claim 9, wherein in the stretching process, the cellulose ester film is stretched to 1.01 to 3.00 times in one direction.

11. The manufacturing method of claim 10, wherein in the stretching process, the cellulose ester film is stretched to 1.10 to 2.00 times in both a longitudinal direction and a lateral direction respectively.

12. The manufacturing method of claim 9, wherein the stretching process is conducted under a temperature of Tg to (Tg+50)° C., where Tg represents a grass transition temperature of the cellulose ester.

* * * * *